United States Patent [19]

Haubert et al.

[11] Patent Number: 4,548,430
[45] Date of Patent: Oct. 22, 1985

[54] CRIMPED HOSE FITTING

[75] Inventors: Steven D. Haubert, Van Wert, Ohio; Stephen T. Indrelunas, Fort Wayne, Ind.

[73] Assignee: Aeroquip Corporation, Jackson, Mich.

[21] Appl. No.: 486,048

[22] Filed: Apr. 18, 1983

[51] Int. Cl.$^4$ ............................................. F16L 33/20
[52] U.S. Cl. .................. 285/256; 285/382.2; 29/508; 29/516
[58] Field of Search ............ 285/256, 259, 236, 382.1, 285/382.2; 29/508, 516

[56] References Cited

U.S. PATENT DOCUMENTS

| 966,513 | 8/1910 | Avery |  |
|---|---|---|---|
| 2,332,893 | 10/1943 | Clickner | 285/90 |
| 2,341,003 | 2/1944 | Watson | 285/256 |
| 2,384,635 | 9/1945 | Melsom | 285/84 |
| 2,401,921 | 6/1946 | Fisher et al. | 285/84 |
| 2,797,111 | 6/1957 | Beazley | 285/149 |
| 3,924,883 | 12/1975 | Frank | 285/256 |

FOREIGN PATENT DOCUMENTS

| 2202580 | 8/1973 | Fed. Rep. of Germany | 285/256 |
|---|---|---|---|
| 2926215 | 1/1980 | Fed. Rep. of Germany | 285/256 |
| 1093615 | 5/1955 | France | 285/256 |
| 0667181 | 2/1952 | United Kingdom | 285/256 |
| 1248395 | 9/1971 | United Kingdom | 285/256 |

Primary Examiner—Cornelius J. Husar
Assistant Examiner—Eric K. Nicholson
Attorney, Agent, or Firm—Beaman & Beaman

[57] ABSTRACT

A crimped fitting for flexible hose wherein the fitting consists of three separate components, namely a nipple, socket and cap, the annular socket being compressed upon the annular cap in a mechanically integral relationship, and the cap being radially compressed upon the tubular nipple. The fitting components are characterized by their economy of manufacture and assembly.

5 Claims, 7 Drawing Figures

CRIMPED HOSE FITTING

BACKGROUND OF THE INVENTION

Fittings utilized with flexible hose usually consist of a nipple component which is received within the hose bore and a socket mounted upon the nipple is usually axially restrained upon the nipple and includes a cylindrical portion radially spaced from the nipple and in axial alignment therewith wherein an annular chamber is defined between the nipple and socket receiving the hose material adjacent the hose end.

The hose material located within the annular chamber defined by the nipple and socket may be retained therein by several techniques. For instance, adhesive may be used to bond the hose within the socket, serrations may be formed upon the nipple or the socket inner surface and where helical serrations are used the fitting may be "threaded" upon the hose end, or the diameter of the socket may be reduced by swaging or compression to compress the hose upon the nipple. Also, combinations of the aforementioned techniques may be utilized, such as employing serrations upon the socket inner surface and swaging or crimping the socket on the hose.

In most hose fitting constructions utilizing the aforementioned relationships, a mechanical interconnection exists between the nipple and socket to restrain relative axial movement therebetween. For instance, radial engaging surfaces may be formed upon the socket and nipple, or the socket may be provided with threads which mate with threads defined on the nipple. The socket will include a radial dimension and portion which is homogeneous with the socket cylindrical wall portion, and as the socket includes both radial and axially extending walls and surfaces, significant machining of the socket is normally required, increasing the costs of socket manufacture.

Further, conventional fitting manufacture limits the material from which the fitting is formed in that, in a swaged or crimped socket fitting, the socket must be of a material which is malleable, but high strength cannot be achieved with soft material, and heat treating and stress relief is complicated.

It is an object of the invention to provide a crimpable hose fitting which is economical to manufacture, easy to machine, and permits a wide variety of material selection for the components of the fitting.

A further object of the invention is to provide a hose fitting which is reliable in operation, capable of being used in high pressure applications, and permits selective components to be heat treated and of high strength characteristics without detracting from the crimpability and assembly of the fitting.

Yet an additional object of the invention is to produce a hose fitting formed of a plurality of assembled components wherein several of the components are deformed during assembly and such deformation improves the strength of the assembled product due to work hardening.

An additional object of the invention is to provide a hose fitting utilizing a socket and nipple wherein axial positioning of the socket on the nipple can be readily varied to adapt the fitting to the particular hose and installation, and wherein the fitting is usable with a wide variety of hose materials, such as rubber, neoprene, synthetic plastic, and the like.

In the practice of the invention the fitting basically consists of an inner nipple, a socket which is crimped upon a hose mounted upon the nipple and a cap mechanically interconnected to the socket and the nipple. Also, connection means, such as a nut or adapter is defined upon the nipple for establishing a sealed connection to the associated system component.

Preferably, the nipple is formed of a cylindrical tube which may be of a conventional copper, steel or aluminum tube size. The outer end of the nipple may be flared, or provided with other conventional connection configuration, and a nut, or threaded adapter may be rotatably mounted upon the nipple for establishing connection of the nipple to another fitting, adapter, port, or the like as well known in the conduit system art.

An annular socket is located over the hose in radial alignment with the nipple and an annular cap having an inner diameter slightly greater than the nipple outer diameter is located upon the nipple adjacent the end of the socket, and the outer diameter of the cap is slightly less than the socket inner diameter wherein the cap may be located within the axial confines of the socket. The circumference of the cap includes a groove.

The fitting will be assembled prior to being located upon the hose end, and such assembly consists of positioning the cap as desired upon the nipple, aligning the socket with the cap, and circumferentially deforming the socket end region in radial alignment with the cap inwardly to force the socket material into the cap groove and simultaneously radially compress the cap upon the nipple outer diameter. In this manner a mechanical interconnection is made between the nipple, cap and socket which is mechanically complete and produces a fluid tight metal-to-metal sealed relationship between the nipple and cap, and cap and socket.

After assembly of the nipple, cap and socket, the end of the hose is inserted into the socket and upon the nipple, and upon the end of the hose engaging the cap, or substantially so, the socket can then be radially crimped, or swaged, inwardly upon the hose to complete the interconnection between fitting and hose.

As the nipple, socket and cap are all of simplified configurations readily manufactured by high production techniques, the cost of a flexible hose fitting as aforedescribed is low, yet the fact that the cap and socket are separate components permits a versatility in material selection not available with conventional hose fitting designs and the mode of assembly of the fitting components permits a flexibility not heretofore present in hose fittings.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
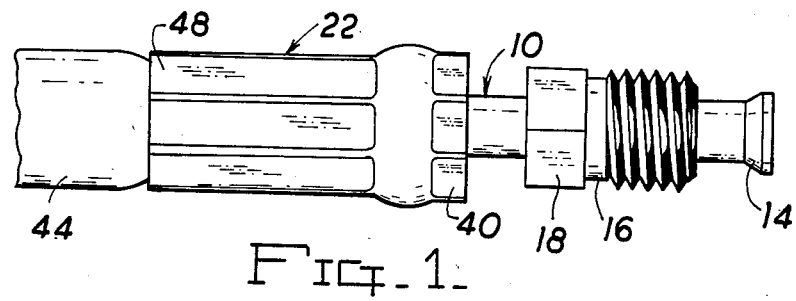
FIG. 1 is an elevational view of a hose and hose fitting in accord with the invention.
Figure 2:
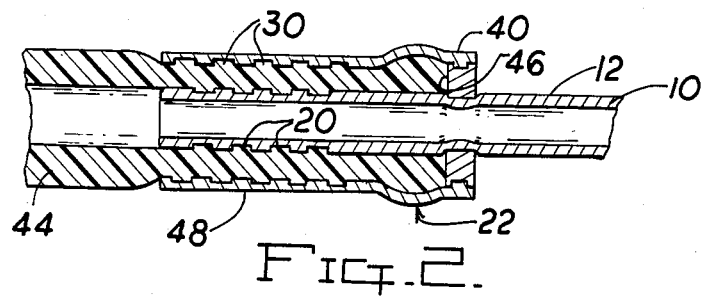
FIG. 2 is an elevational, sectional, detail view of the hose fitting as mounted upon a hose.

The assembled relationship of the components of a flexible hose fitting in accord with the invention are best appreciated from FIGS. 1 and 2. The fitting includes a nipple 10 which may be formed of conventional copper, steel or aluminum tubing having an outer cylindrical diameter 12, and the outer end of the nipple, in the disclosed embodiment, is formed with a conventional flare 14. An annular threaded nut 16 is rotatably mounted upon the external portion of the nipple, and the nut includes a hexagonal portion 18 defining the usual wrench flats, and is externally threaded for cooperation with the threads of a female connector, not shown, which includes a conical sealing surface for cooperating with the flare 14, and in the usual manner tightening of the nut 16 into the associated conduit system component establishes a sealed relationship.

If desired, the nipple may be formed with a plurality of annular serrations 20 defined upon the inner end region of the nipple, and these serrations may be formed by machining, rolling or stamping.

Figure 5:
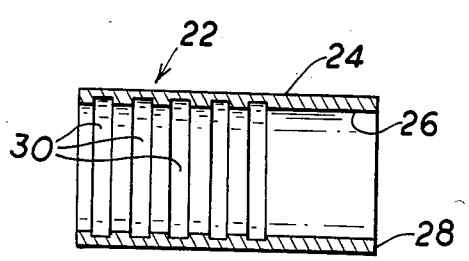
FIG. 5 is an elevational, diametrical, sectional view of the socket, per se.

The fitting socket 22, FIG. 5, is of cylindrical form including an outer surface 24 and an inner cylindrical surface 26. The socket includes inner end 28, and a plurality of annular serrations 30 may be formed within the socket inner diameter by machining, rolling or other known process. The socket may be formed of stainless steel seamless tubing and is economically producible at low cost. As the socket will be crimped, the socket material is ductile enough to permit crimping without material failure.

Figure 6:
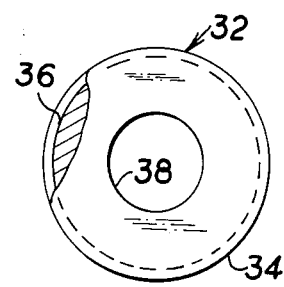
FIG. 6 is an elevational view of the cap, per se, a portion thereof being shown in section.
Figure 7:
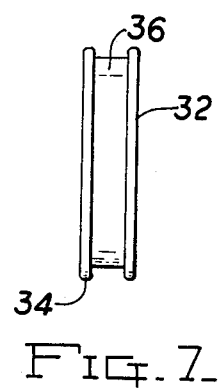
FIG. 7 is an end elevational view of the cap.

The annular cap 32 interposed between the nipple and socket is best represented in FIGS. 6 and 7, and the cap may be formed of stainless steel and is of a generally disc-like configuration having an outer circumference 34 in which an annular groove 36 is formed. The cap 32 includes a cylindrical inner diameter bore 38, and the outer diameter of the cap is less than the inner diameter of the socket 22. For instance, with a socket having a 0.430" inner diameter, the diameter of the cap is 0.425".

Assembly of the fitting components is as follows:

The nipple 10 will be flared at 14, and the nut 16 placed upon the nipple adjacent the flare. Thereupon, the inner end of the nipple is inserted into the cap bore 38, and the cap is axially located upon the nipple as desired. The cap is capable of being axially displaced upon the nipple as the inner diameter of the cap is slightly greater than the nipple diameter. For instance, in a nipple having an outer diameter of 0.191", the cap bore diameter is 0.193".

Upon the cap 32 being located on the nipple as desired, the socket 22 is placed over the nipple wherein the outer nipple end is in alignment with the outer edge of the cap 32, and in a typical assembly the cap will be located such that the nipple inner end aligns with the inner end of the socket.

Figure 4:
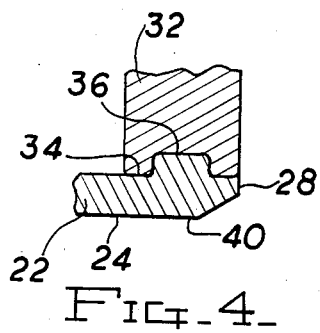
FIG. 4 is an enlarged, detail, elevational, sectional view of the cap circumference and socket interrelationship.

With the nipple, cap and socket aligned as aforedescribed, the end region 40 of the socket in alignment with the cap 32 is deformed inwardly within an appropriate die such that the material of the socket is forced into the cap circumferential groove 36, FIG. 4. The socket material will fill the socket groove 36 producing a firm mechanical fluid tight interrelationship between the cap and socket.

Figure 3:
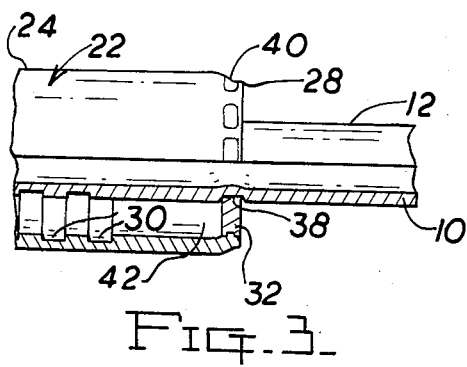
FIG. 3 is a detail, elevational view, partially sectioned, of a hose fitting in accord with the invention after assembly and before crimping.

The radial forces imposed upon the socket 22 during assembly to the cap are sufficient to also radially contract the material of the cap causing the inner diameter bore 38 of the cap to reduce to a dimension less than the nipple outer diameter annularly embedding the cap into the nipple as will be apparent from FIGS. 2 and 3. Thus, a mechanical connection is achieved between the cap and the nipple simultaneously with the assembly of the socket to the cap.

The assembled fitting now defines an annular chamber 42, FIG. 3, between the nipple and socket for receiving the end of the flexible hose 44. The end 46 of the hose is normally inserted into the chamber 42 until the cap 32 is engaged. Thereupon, the assembly is placed within conventional socket crimping or swaging apparatus, not shown, and the socket 22 is radially deformed inwardly at 48 to compress the hose material upon the nipple extruding the hose material into the nipple and socket serrations producing an effective fluid tight and mechanical connection. As will be appreciated from FIGS. 1 and 2, the region of socket deformation 48 is axially spaced from the socket outer end in order not to adversely affect the assembly of the socket, cap and nipple.

A hose fitting, as described above, is capable of effectively handling relatively high internal hose pressures, and the fact that the fitting components are formed of separate components mechanically interconnected in an effective manner provides a versatility of material selection unusual in the hose fitting art. The nipple 10 may be formed of a relatively soft material, while the cap and socket may be of a material of greater hardness. Materials may be used in the socket and cap which harden when worked during the assembly procedure, and the cap and nipple may be heat treated to the most advantageous physical characteristics. Fittings constructed in accord with the invention are readily usable with synthetic plastic hoses, and as the cap and socket may be axially assembled upon the nipple at any desired location, an axial adjustment of the relationship between nipple and socket is available not possible with more conventional hose fitting constructions.

It is appreciated that various modifications to the inventive concepts may be apparent to those skilled in the art without departing from the spirit and scope of the invention.

We claim:

1. The method of forming a crimpable hose fitting wherein the fitting comprises a cylindrical metal deformable nipple, a cylindrical metal deformable socket concentrically circumscribing the nipple having an inner end, and an annular metal deformable cap having an outer face, an inner diameter substantially equal to the nipple outer diameter, an outer diameter less than inner diameter of the socket having an annular groove defined therein defining equal diameter portions on each side thereof, comprising the steps of:
   (a) axially locating the cap upon the nipple,
   (b) axially positioning the socket over the nipple and in radial alignment with the cap wherein the socket inner end is in alignment with the cap outer face, and
   (c) radially deforming the socket portion in radial alignment with the cap into engagement with the cap to force the material of the socket into the cap groove to seal the socket to the cap and simultaneously radially inwardly deform the cap to deform inwardly the aligned nipple to form a sealed mechanical relationship with the nipple.

2. A crimped fitting for flexible hose comprising, in combination, a tubular metal deformable nipple having an outer diameter, an annular socket concentrically circumscribing at least a portion of said nipple having an inner end and an inner diameter, and an annular metal deformable cap having an inner diameter less than the nipple outer diameter deforming the aligned nipple outer diameter inwardly sealingly engaging said nipple and an outer diameter including an annular circumferential groove sealingly engaging said socket inner diameter, said socket being radially deformed inwardly into said groove to form the sealed relationship with said cap, the radial deformation of said socket into said groove simultaneously radially contracting said cap to deform the aligned nipple outer diameter inwardly.

3. In a crimped fitting for flexible hose as in claim 2, said nipple comprising a tube.

4. In a crimped fitting for flexible as in claim 2, said nipple comprising a tube of standard size.

5. In a crimped fitting for flexible hose as in claim 2, said cap including an outer face and substantially equal diameter annular ridges defined upon each side of said cap groove defining the maximum outer diameter of said cap, said cap outer face being in radial alignment with said socket inner end and said ridges conforming to the configuration of the engaging socket inner diameter.

* * * * *